(12) United States Patent
Lackinger et al.

(10) Patent No.: US 9,831,013 B2
(45) Date of Patent: Nov. 28, 2017

(54) CABLE SET, WINDING TAPE AND PROCESS FOR PRODUCING THE CABLE SET

(71) Applicant: LEONI BORDNETZ-SYSTEME GMBH, Kitzingen (DE)

(72) Inventors: Andreas Lackinger, Ochsenfurt (DE); Gerhard Hein, Uffenheim (DE)

(73) Assignee: LEONI Bordnetz-Systeme GmbH, Kitzingen (DE)

( * ) Notice: Subject to any disclaimer, the term of this patent is extended or adjusted under 35 U.S.C. 154(b) by 68 days.

(21) Appl. No.: 14/921,118

(22) Filed: Oct. 23, 2015

(65) Prior Publication Data

US 2016/0042834 A1 Feb. 11, 2016

Related U.S. Application Data

(63) Continuation of application No. PCT/EP2014/000715, filed on Mar. 17, 2014.

(30) Foreign Application Priority Data

Apr. 23, 2013 (DE) .................... 20 2013 003 788 U

(51) Int. Cl.
| | |
|---|---|
| *H01B 7/18* | (2006.01) |
| *H01B 13/22* | (2006.01) |
| *H01B 17/56* | (2006.01) |
| *H01B 7/00* | (2006.01) |
| *H01B 13/012* | (2006.01) |
| *B29L 31/34* | (2006.01) |
| *B29C 44/12* | (2006.01) |

(52) U.S. Cl.
CPC ............ *H01B 7/184* (2013.01); *H01B 7/0045* (2013.01); *H01B 13/22* (2013.01); *H01B 17/56* (2013.01); *B29C 44/1219* (2013.01); *B29L 2031/3462* (2013.01); *H01B 13/01263* (2013.01)

(58) Field of Classification Search
None
See application file for complete search history.

(56) References Cited

U.S. PATENT DOCUMENTS

| | | | | |
|---|---|---|---|---|
| 471,588 | A * | 3/1892 | Williams | ........... H01B 11/1847 174/29 |
| 1,743,506 | A * | 1/1930 | Watson | .................... H01B 7/18 174/110 R |
| 1,770,851 | A * | 7/1930 | Hayman | .............. H01B 9/0611 174/106 D |
| 1,770,877 | A * | 7/1930 | Clark | ........................ 174/106 D |

(Continued)

FOREIGN PATENT DOCUMENTS

DE 102006049655 A1 5/2007

*Primary Examiner* — Chau N Nguyen
*Assistant Examiner* — Muhammed Azam
(74) *Attorney, Agent, or Firm* — Laurence A. Greenberg; Werner H. Stemer; Ralph E. Locher

(57) ABSTRACT

A cable set includes a line run having a multiplicity of lines. A protective sheath surrounds the line run. A taping is disposed between the line run and the protective sheath. The taping surrounds the line run and has nubs projecting outward to the protective sheath. At least some of the nubs pass through the protective sheath. A winding tape for winding around a line run for producing a cable set and a method for producing a cable set are also provided.

17 Claims, 1 Drawing Sheet

(56) References Cited

U.S. PATENT DOCUMENTS

| | | | | |
|---|---|---|---|---|
| 1,939,264 A * | 12/1933 | Hill | H01B 9/0611 | 174/25 R |
| 1,980,388 A * | 11/1934 | Del Mar | H01B 9/0611 | 174/106 R |
| 2,015,063 A * | 9/1935 | Bennett | 174/11 R | |
| 2,038,894 A * | 4/1936 | Del Mar | H01B 7/0241 | 156/53 |
| 2,167,538 A * | 7/1939 | Turk | H01B 11/1873 | 156/47 |
| 2,583,026 A * | 1/1952 | Swift | H01B 7/188 | 156/209 |
| 2,591,794 A * | 4/1952 | Ebel | H01B 9/06 | 174/102 C |
| 2,890,263 A * | 6/1959 | Brandes | H01B 11/1808 | 174/102 D |
| 3,490,122 A * | 1/1970 | Eikos | F16L 13/11 | 137/15.09 |
| 3,514,523 A * | 5/1970 | Hildebrand | H01B 11/1847 | 174/28 |
| 3,571,863 A * | 3/1971 | Logan | H01B 7/0045 | 174/72 A |
| 3,609,207 A * | 9/1971 | Maschio | H01B 9/0611 | 174/120 FP |
| 3,619,474 A * | 11/1971 | Beck | H01B 11/1834 | 138/113 |
| 3,701,840 A * | 10/1972 | Willmore | H01B 7/02 | 174/102 D |
| 4,939,317 A * | 7/1990 | Hostler | H01B 11/1847 | 174/107 |
| 5,837,940 A * | 11/1998 | Moncrieff | H01G 4/06 | 174/107 |
| 6,034,588 A * | 3/2000 | Ando | H01B 12/06 | 174/125.1 |
| 6,060,663 A * | 5/2000 | Hier | H01B 7/184 | 174/110 F |
| 6,069,319 A | 5/2000 | Davis, Jr. et al. | | |
| 6,153,825 A * | 11/2000 | Ando | H01B 12/06 | 174/15.4 |
| 6,534,715 B1 * | 3/2003 | Maunder | H01B 7/184 | 174/110 R |
| 7,304,234 B2 | 12/2007 | Seki | | |
| 8,365,775 B2 * | 2/2013 | Bull | B21C 37/154 | 138/112 |

\* cited by examiner

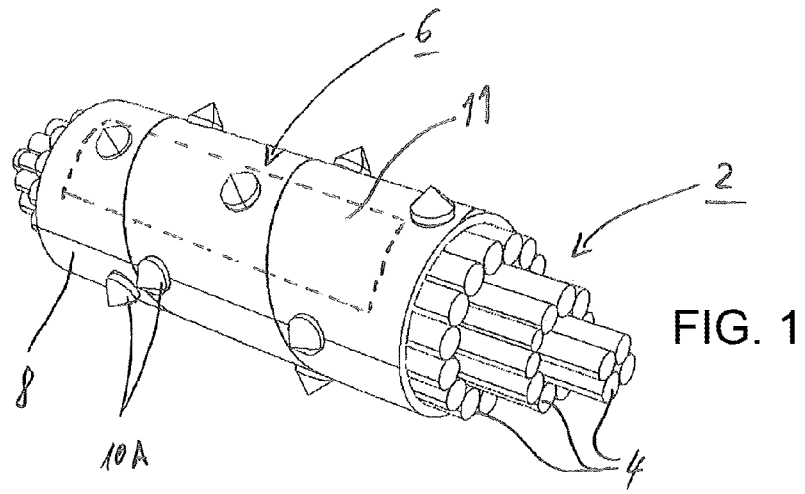
FIG. 1
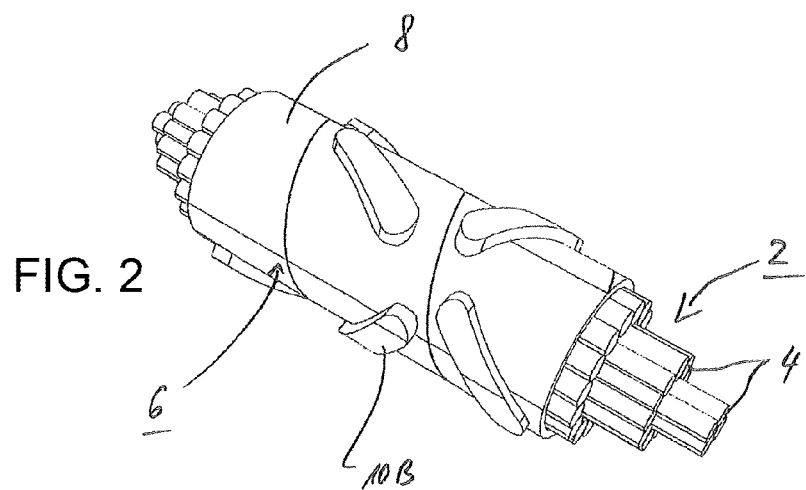
FIG. 2
FIG. 3
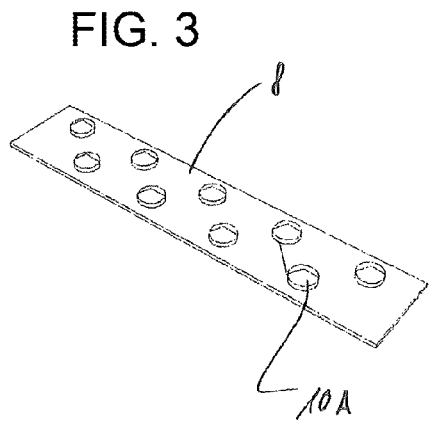
FIG. 4
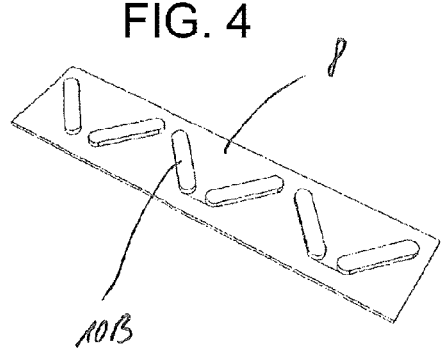

CABLE SET, WINDING TAPE AND PROCESS FOR PRODUCING THE CABLE SET

CROSS-REFERENCE TO RELATED APPLICATION

This is a continuation, under 35 U.S.C. §120, of copending International Application PCT/EP2014/000715, filed Mar. 17, 2014, which designated the United States; this application also claims the priority, under 35 U.S.C. §119, of German Patent Application DE 20 2013 003 788.1, filed Apr. 23, 2013; the prior applications are herewith incorporated by reference in their entirety.

BACKGROUND OF THE INVENTION

Field of the Invention

The invention relates to a cable set including a line run having a number of lines and a protective sheath surrounding the line run. The invention further relates to a winding tape, in particular for a cable set of this kind, and to a method for producing a cable set.

Cable sets in the motor vehicle sector often have a plurality of individual lines which form a line run that is surrounded by an external protective sheath. The protective sheath is often in the form of a protective sheath which is encapsulated by injection molding, encapsulated by foaming or encapsulated by casting and is referred to as a protective sheath for short in the text which follows. To this end, the line run is placed into a mold, before the material of the protective sheath is then subsequently introduced and cured in order to form the protective sheath. The material of the protective sheath is liquid or viscous in the processing state. The protective sheath also serves, in particular, for chafe or wear protection since there is a risk of the insulation of the individual lines being chafed or worn in critical regions due to the vibrations produced during driving. In addition, the protective sheath can also have a shaping function in order to impress a predefined shape on the cable set to simplify laying during assembly.

Due to the production method for the protective sheath, there is, in principle, a risk of the individual lines which are often loosely situated in the mold being forced outward by the material, in particular by foaming, and being accessible from outside the protective sheath at least in subregions, that is to say they are no longer being covered by the material. That can lead to undesired chafing or wearing of the insulation in those regions and therefore to electrical malfunctions.

Furthermore, it is possible to provide ribs in the mold, so that the protective sheath has a corrugated or ribbed outer surface overall. The individual lines can then be supported solely on the inner ribs. Although the individual lines can then be identified from the outside in rib valleys, the remaining, radially projecting ribs further provide sufficient protection. However, that requires special measures on the mold. In addition, the ability to clearly see the individual lines is also found to be visually disturbing.

SUMMARY OF THE INVENTION

It is accordingly an object of the invention to provide a cable set, a winding tape and a process for producing the cable set, which overcome the hereinafore-mentioned disadvantages of the heretofore-known devices and methods of this general type and which provide an improved cable set with a line run which is composed of a number of lines and is surrounded by an, in particular, foamed protective sheath.

With the foregoing and other objects in view there is provided, in accordance with the invention, a cable set, comprising a line run having a multiplicity of lines, a protective sheath surrounding the line run, and a taping disposed between the line run and the protective sheath. The taping surrounds the line run and has nubs projecting outward to the protective sheath.

Accordingly, the cable set is provided with a taping which has nubs that project outward toward the protective sheath and which is disposed between the line run or line bundle, which includes a large number of individual lines, and an external protective sheath. The protective sheath is a cast, foamed or injection-molded protective sheath. This is to be understood to mean that the protective sheath is formed by insertion into a mold and encapsulation by injection molding, encapsulation by foaming or encapsulation by casting using a correspondingly suitable material.

During production, the line run is centered and fixed within a cavity in the mold by the radially projecting nubs, so that contact between the individual lines and the wall of the cavity is reliably prevented. This also ensures that none of the individual lines are freely accessible from the outside. In other words, this means that each of the lines is reliably and securely always surrounded by the material of the protective sheath.

Configuring the taping with the nubs which are fitted on the taping has the particular advantage that further measures, in particular on the mold, can be dispensed with. Therefore, no ribs are formed on the inner wall of the mold. The corresponding mold preferably also has only smooth walls.

For production purposes, the procedure proceeds overall in such a way that, in a first step, the taping is first wound around the line run and the line run which is wound up in this way is then inserted into the mold, wherein the nubs come into contact with a wall of the mold at least in subregions in the process. In this case, the nubs are preferably in contact with the wall of the mold over the entire length of the line run at least in circumferential subregions. In a third step, the protective sheath is then finally formed by encapsulation by casting, encapsulation by injection molding or encapsulation by foaming within the mold. After the previously liquid or viscous material of the protective sheath has cured, the finished cable set is then removed from the mold.

According to this production method, the nubs are therefore also embedded in the protective sheath in a preferred refinement, that is to say the nubs are surrounded by the material of the protective sheath. During encapsulation by injection molding, the material therefore flows around the respective nubs, and therefore the nubs are situated in the protective sheath in a form-locking manner. In order to reliably ensure this, the nubs are disposed at a distance from one another in an expedient development, specifically in such a way that desired flowing of material around the nubs is reliably ensured, in particular also taking into account the flow properties and the conditions during encapsulation by injection molding.

In a preferred development, at least some of the nubs pass through the protective sheath, and therefore are freely accessible from the outside. The radially external outer face of the nubs is therefore in alignment with surface regions of the protective sheath. Since the nubs at least partially come into contact with the inner wall of the mold during encapsulation by casting, at least some of the nubs are not surrounded by the material in these external radial surface regions. However, this is not critical with respect to functioning since the nubs themselves, just like the protective sheath, serve for chafe or wear protection for example.

In order to make the passage of the nubs as visually discreet as possible, the nubs and the protective sheath expediently have an identical, or at least similar, color. The nubs and the protective sheath are preferably composed of a comparable or identical material in this case.

In order to achieve efficient centering of the line run, the nubs preferably have an extent of several millimeters in the radial direction. In this case, the nubs have, for example, a radial extent of at least three, and for example three to five, millimeters.

The taping expediently includes a flexible winding tape with nubs integrally formed thereon. Due to the structure of a winding tape, nubs can be fitted to the line run by simply being wound around the line run.

According to a first variant embodiment, the nubs are subsequently fitted to an existing carrier tape in this case. According to a second alternative variant embodiment, the nubs are an integral, monolithic constituent part of the winding tape itself.

Overall, the winding tape is preferably composed of plastic in which the individual nubs are integrally formed. A textile winding tape with nubs fastened to it is used as an alternative.

With respect to mounting which is as simple as possible, the winding tape is constructed to be adhesive in particular on its inner face which is averted from the nubs. This provides good adhesion to the line run, so that the winding tape does not slip before or during the foaming or injection molding process.

The nubs can have different shapes. According to a first preferred refinement, the nubs are in the form of elongate webs which preferably extend obliquely to a longitudinal direction of the winding tape. Elongate webs are to be understood as webs with an approximately rectangular basic cross section, possibly with rounded corners, or else oval, curved, etc. webs in which the web length is a multiple of the web width. Due to an oblique positioning of the webs, the flow of material during encapsulation by injection molding is positively influenced, and therefore preferably no cavities are produced.

In an alternative variant embodiment, the nubs are provided with a round cross-sectional area and, for example, are constructed in a cylindrical or else conical manner or a mixture thereof.

In a preferred development, the nubs taper in the radial direction and also have, for example, a pointed end point, for example a conical tip, in this case. Due to this measure, the abutment and contact area with the wall of the mold is kept as low as possible.

With the objects of the invention in view, there is also provided a winding tape for winding around a line run for producing a cable set, in particular a cable set according to the invention. The winding tape comprises nubs formed on and projecting from the winding tape.

With the objects of the invention in view, there is concomitantly provided a method for producing a cable set, in particular a cable set according to the invention. The method comprises providing a taping with outwardly-projecting nubs, fitting the taping with the outwardly-projecting nubs to a line run having a multiplicity of lines, then inserting the line run provided with the taping into a mold with the nubs coming into contact with a wall of the mold at least in subregions, and then forming a protective sheath in the mold by casting, injection-molding or foaming encapsulation of the line run provided with the taping.

The advantages cited with respect to the cable set and preferred refinements can analogously also be transferred to the winding tape and also to the method. Thus, the winding tape is, in particular, a plastic tape of which one side has an adhesive construction and the other side has integrally formed nubs.

Other features which are considered as characteristic for the invention are set forth in the appended claims.

Although the invention is illustrated and described herein as embodied in a cable set, a wound tape and a process for producing the cable set, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a simplified, diagrammatic, perspective view of a portion of a line run of a cable set around which a winding tape according to a first variant embodiment is wound;

FIG. 2 is a simplified view which is comparable to FIG. 1 of a winding tape according to a second variant embodiment;

FIG. 3 is a simplified perspective view of part of a piece of a winding tape according to the first variant embodiment; and FIG. 4 is a simplified perspective view of part of a piece of the winding tape according to the second variant embodiment.

DETAILED DESCRIPTION OF THE INVENTION

Referring now to the figures of the drawings in detail and first, particularly, to FIGS. 1 and 2 thereof, there is seen a cable set which is only illustrated in detail and incompletely and includes a bundle of lines or a line run 2 having a plurality of individual lines 4 which are disposed in several layers in the exemplary embodiment. These lines 4 are, in particular, electrical power and/or data lines which are electrically insulated from one another. It is also possible to provide other types of lines, such as hydraulic, pneumatic lines, etc. for example, in principle. However, the lines are preferably exclusively electrical lines.

The entire line run 2 is surrounded by a taping 6 which covers the line run 2 over the entire surface in the exemplary embodiments, so that no clearances are formed. The taping 6 itself includes a winding tape 8 on which nubs 10A, 10B are integrally formed on the radially outer face. In this case, the winding tape 8 is preferably a plastic tape in the case of which the individual nubs 10A, 10B are also integrally formed. As an alternative, the winding tape 8 can also be a textile carrier tape on which nubs which are composed of a different material are fitted in a suitable way, for example by adhesive bonding or by textile processing techniques. The winding tape is wound overall in a spiral manner around the line run 2.

The initial state of the winding tape 8 is illustrated in each of FIGS. 3 and 4. The winding tape 8 is preferably a continuous piece goods item which is, for example, wound up into a roll and unwound to form the taping 6.

In the first variant embodiment according to FIGS. 1 and 3, conical nubs 10A are formed with a cylindrical cone base and a cone tip adjoining the cone base. As can be seen in FIG. 3 in particular, in this case several individual nubs 10A are disposed in the longitudinal direction of the winding tape 8, in two rows in the exemplary embodiment, wherein the individual nubs 10A of a respective row are distributed equidistantly in relation to one another in the longitudinal direction. In the exemplary embodiment, the two rows are offset in relation to one another by the distance between two nubs 10A which follow one another in the longitudinal direction.

In the second variant embodiment according to FIGS. 2 and 4, the nubs 10B are, in contrast, in the form of webs, the length of which is a multiple of their width. In the exemplary embodiment, the webs are approximately in the form of rectangular structures with rounded edge regions.

As is shown in FIG. 4 in particular, the nubs 10B are disposed in an approximately V-shaped manner in relation to one another, that is to say they are oriented alternately obliquely at the same angle in relation to the longitudinal direction of the winding tape 8 overall. The length of the web-shaped nubs 10B at least approximately reaches the width of the winding tape. Due to this configuration, a large supporting surface is formed on one side by the radially outer face of the nubs 10B. At the same time, it is ensured that the material for forming the protective sheath can reliably flow around the individual nubs 10B during the production process.

The height of the nubs 10A, 10B is typically several millimeters, for example three to ten millimeters. In this case, the height of the nubs also corresponds, in particular, to the minimum wall thickness of a protective sheath 11 which surrounds the line run in the final state.

This protective sheath 11, which is only partially illustrated in broken lines in FIG. 1 so as not to obscure the other elements, but is also provided in the embodiment of FIG. 2, is produced by an injection molding process, a casting process and in particular a foaming process. At least some of the nubs 10A, B may pass through the protective sheath 11. To this end, the line run 2 around which the winding tape 8 is wound is placed into a mold and the injection molding, casting or foaming material for forming the protective sheath 11 is then introduced into the mold. After curing, the cable set which is then finished is removed from the mold. Plugs or the like which are, for example, also embedded in the protective sheath 11 are expediently already fastened to the ends of the individual lines 4.

In order to allow simple preparation of the line run 2, the winding tape 8 has an adhesive construction and has an adhesive layer on its inner face which is opposite the nubs 10A, 10B, so that the winding tape 8 adheres well to the lines 4 and does not slip when being wound around the line run 2.

With respect to the intended application of a cable set of this kind, in particular in a motor vehicle, the winding tape 8 is preferably temperature-resistant up to temperatures of 100° C. and, in particular, up to temperatures of 150° C., so that a cable set of this kind is in particular also suitable for laying in the engine compartment. Furthermore, the winding tape 8 is also media-resistant, that is to say suitable for harsh environmental conditions in which it may come into contact with media, such as cooling liquid, oil, etc. for example.

The production of a cable set is simplified and is also made less expensive overall by virtue of the winding tape 8, which is also called a nubbed tape, and is described herein as having the nubs 10A, 10B formed on it. Firstly, a rib structure which is otherwise required in the die can be dispensed with. Due to the nubs 10A, 10B, the line run 2 is situated in a centered manner overall in a corresponding cavity in the mold. Damage to the individual lines, for example when the mold is closed, is also at least virtually precluded. In this case, the dimensioning of the individual nubs 10A, 10B is expediently selected in conjunction with the line run 2 in such a way that the line run 2 around which tape is wound is clamped within the respective cavity in the die. This is not particularly critical since there is no fear of damage to the individual lines 4 as a result. However, at the same time, a strong centering effect is achieved as a result and the configuration of separate holding-down devices or other holders on the mold is not required and accordingly not provided either. Overall, it is possible to lay the prepared line run 2 into the mold more quickly and more simply during production as a result. At the same time, a strong protective function for the individual lines 4 is simultaneously ensured. In addition, this ensures, overall, that the lines 4 are not visible from the outside.

The invention claimed is:

1. A cable set, comprising:
    a line run having a multiplicity of lines;
    a protective sheath surrounding said line run; and
    a taping disposed between said line run and said protective sheath, said taping surrounding said line run and having nubs projecting outward to said protective sheath and at least some of said nubs passing through said protective sheath.

2. The cable set according to claim 1, wherein said protective sheath is a cast, injection-molded or foam encapsulation.

3. The cable set according to claim 1, wherein said nubs are embedded in said protective sheath.

4. The cable set according to claim 1, wherein said nubs are disposed at a distance from one another, and said protective sheath is formed of a material disposed around said nubs.

5. A method for producing a cable set, the method comprising the following steps:
    providing a taping with outwardly-projecting nubs;
    fitting the taping with the outwardly-projecting nubs onto a line run having a multiplicity of lines;
    then inserting the line run provided with the taping into a mold with the nubs coming into contact with a wall of the mold at least in subregions; and
    then forming a protective sheath around the taping in the mold by casting, injection-molding or foaming encapsulation of the line run provided with the taping and causing at least some of the nubs to pass through the protective sheath.

6. The cable set according to claim 1, wherein said nubs extend at least three millimeters in radial direction.

7. The cable set according to claim 1, wherein said taping is formed of a flexible winding tape with said nubs formed thereon.

8. The cable set according to claim 7, wherein said winding tape is formed of plastic.

9. The cable set according to claim 7, wherein said winding tape has an adhesive inner surface.

10. The cable set according to claim 9, wherein said adhesive inner surface faces away from said nubs.

11. The cable set according to claim 7, wherein said winding tape is wound in a spiral manner around said line run and covers said line run.

12. The cable set according to claim 11, wherein said winding tape covers an entire surface of said line run.

13. The cable set according to claim 1, wherein said nubs are formed as elongate webs.

14. The cable set according to claim 13, wherein said winding tape has a longitudinal direction, and said webs are oriented obliquely relative to said longitudinal direction.

15. The cable set according to claim 1, wherein said nubs have a cylindrical or conical shape.

16. The cable set according to claim 1, wherein said nubs taper in a radial direction.

17. A winding tape for winding around a line run surrounded by a protective sheath for producing a cable set according to claim 1, the winding tape comprising:

nubs formed on and projecting from the winding tape, at least some of said nubs passing through the protective sheath.

* * * * *